(12) United States Patent
Easton et al.

(10) Patent No.: US 7,495,560 B2
(45) Date of Patent: Feb. 24, 2009

(54) WIRELESS PICOCELLULAR RFID SYSTEMS AND METHODS

(75) Inventors: Martyn N. Easton, Lenoir, NC (US); Michael Sauer, Corning, NY (US); Richard S. Vodhanel, Red Bank, NJ (US)

(73) Assignee: Corning Cable Systems LLC, Hickory, NC (US)

( * ) Notice: Subject to any disclaimer, the term of this patent is extended or adjusted under 35 U.S.C. 154(b) by 215 days.

(21) Appl. No.: 11/430,113

(22) Filed: May 8, 2006

(65) Prior Publication Data

US 2007/0257796 A1 Nov. 8, 2007

(51) Int. Cl.
G08B 13/14 (2006.01)
(52) U.S. Cl. .................................. 340/572.1
(58) Field of Classification Search ... 340/572.1–572.9, 340/539.13, 825.49, 10.1; 455/41.2, 456.1
See application file for complete search history.

(56) References Cited

U.S. PATENT DOCUMENTS

| | | | |
|---|---|---|---|
| 4,916,460 A | 4/1990 | Powell | 343/853 |
| 5,301,056 A | 4/1994 | O'Neill | 359/145 |
| 5,339,184 A | 8/1994 | Tang | 359/124 |
| 5,400,391 A | 3/1995 | Emura et al. | 379/59 |
| 5,424,864 A | 6/1995 | Emura | 359/173 |
| 5,444,564 A | 8/1995 | Newberg | 359/187 |
| 5,457,557 A | 10/1995 | Zarem et al. | 359/121 |
| 5,627,879 A | 5/1997 | Russell et al. | 379/59 |
| 5,640,678 A | 6/1997 | Ishikawa et al. | 455/33.2 |
| 5,644,622 A | 7/1997 | Russell et al. | 455/422 |
| 5,648,961 A | 7/1997 | Ebihara | 370/282 |
| 5,682,256 A | 10/1997 | Motley et al. | 359/117 |

(Continued)

FOREIGN PATENT DOCUMENTS

EP 0477952 A2 9/1991

(Continued)

OTHER PUBLICATIONS

Kojucharow, K. et al., Millimeter-Wave Signal Properties Resulting Form Electrooptical Upconversion, IEEE Transaction on Microwave Theory and Techniques, vol. 49, No. 10, Oct. 2001, p. 1977-1985.

(Continued)

Primary Examiner—Phung Nguyen
(74) Attorney, Agent, or Firm—C. Keith Montgomery

(57) ABSTRACT

The wireless radio-frequency identification (RFID) picocellular system includes a central control station optically coupled to one or more electrical-optical (E-O) access point devices that generate the individual picocells. The central control station includes service units that provide conventional wireless cellular services, and further includes one or more RFID reader units. The E-O access point devices are adapted to receive electromagnetic RFID tag signals from RFID tags within the associated picocell and transmit optical RFID tag signals to the central control station, which converts the optical RFID tag signals to electrical RFID tag signals, which are then received by the one or more RFID reader units. The system allows for large numbers of RFID tags in the picocellular coverage area to be quickly read and the information stored. The relatively small size of picocells allows for high-precision locating and position tracking of items without the need for manually scanning RFID tags with an RFID reader.

19 Claims, 5 Drawing Sheets

U.S. PATENT DOCUMENTS

| | | | |
|---|---|---|---|
| 5,854,986 A | 12/1998 | Dorren et al. | 455/562 |
| 5,867,485 A | 2/1999 | Chambers et al. | 370/281 |
| 5,936,754 A | 8/1999 | Ariyavisitakul et al. | 359/145 |
| 5,946,622 A | 8/1999 | Bojeryd | 455/444 |
| 5,969,837 A | 10/1999 | Farber et al. | 359/132 |
| 6,005,884 A | 12/1999 | Cook et al. | 375/202 |
| 6,016,426 A | 1/2000 | Bodell | 455/422 |
| 6,127,917 A | 10/2000 | Tuttle | 340/10.1 |
| 6,128,470 A | 10/2000 | Naidu et al. | 455/16 |
| 6,150,921 A | 11/2000 | Werb et al. | 340/10.1 |
| 6,268,946 B1 | 7/2001 | Larkin et al. | 359/173 |
| 6,292,673 B1 | 9/2001 | Maeda et al. | 455/522 |
| 6,324,391 B1 | 11/2001 | Bodell | 455/403 |
| 6,337,754 B1* | 1/2002 | Imajo | 398/115 |
| 6,353,406 B1 | 3/2002 | Lanzl et al. | 342/118 |
| 6,374,124 B1 | 4/2002 | Slabinski | 455/562 |
| 6,405,018 B1 | 6/2002 | Reudink et al. | 455/20 |
| 6,405,058 B2 | 6/2002 | Bobier | 455/562 |
| 6,438,371 B1 | 8/2002 | Fujise et al. | 455/422 |
| 6,477,154 B1 | 11/2002 | Cheong et al. | 370/328 |
| 6,512,478 B1* | 1/2003 | Chien | 342/357.09 |
| 6,788,666 B1 | 9/2004 | Linebarger et al. | 370/338 |
| 6,801,767 B1 | 10/2004 | Schwartz et al. | 455/426.2 |
| 6,807,374 B1 | 10/2004 | Imajo et al. | 398/115 |
| 6,865,390 B2 | 3/2005 | Goss et al. | 455/445 |
| 6,883,710 B2 | 4/2005 | Chung | 235/385 |
| 6,885,846 B1 | 4/2005 | Panasik et al. | 455/41.2 |
| 6,909,399 B1 | 6/2005 | Zegelin et al. | 342/463 |
| 6,920,330 B2 | 7/2005 | Caronni et al. | 455/456.1 |
| 6,931,183 B2 | 8/2005 | Panak et al. | 385/101 |
| 6,933,849 B2 | 8/2005 | Sawyer | 340/572.4 |
| 6,965,718 B2 | 11/2005 | Koertel | 385/101 |
| 7,013,087 B2 | 3/2006 | Suzuki et al. | 398/115 |
| 7,020,473 B2 | 3/2006 | Splett | 455/456.1 |
| 7,039,399 B2 | 5/2006 | Fischer | 455/422.1 |
| 7,072,586 B2 | 7/2006 | Aburakawa et al. | 398/115 |
| 7,084,769 B2 | 8/2006 | Bauer et al. | 340/572.7 |
| 7,295,119 B2* | 11/2007 | Rappaport et al. | 340/572.4 |
| 2002/0075906 A1 | 6/2002 | Cole et al. | 370/535 |
| 2002/0130778 A1 | 9/2002 | Nicholson | |
| 2002/0181668 A1 | 12/2002 | Masoian et al. | 379/56.3 |
| 2002/0190845 A1 | 12/2002 | Moore | |
| 2003/0045284 A1 | 3/2003 | Copley et al. | 455/426 |
| 2003/0141962 A1 | 7/2003 | Barink | |
| 2003/0165287 A1 | 9/2003 | Krill et al. | 385/24 |
| 2003/0174099 A1 | 9/2003 | Bauer et al. | |
| 2003/0209601 A1 | 11/2003 | Chung | |
| 2004/0008114 A1 | 1/2004 | Sawyer | |
| 2004/0017785 A1 | 1/2004 | Zelst | 370/328 |
| 2004/0047313 A1 | 3/2004 | Rumpf et al. | 370/335 |
| 2004/0078151 A1 | 4/2004 | Aljadeff et al. | |
| 2004/0157623 A1 | 8/2004 | Splett | |
| 2004/0203704 A1 | 10/2004 | Ommodt et al. | 455/422.1 |
| 2004/0203846 A1 | 10/2004 | Caronni et al. | |
| 2004/0204109 A1 | 10/2004 | Hoppenstein | 455/562.1 |
| 2004/0233877 A1 | 11/2004 | Lee et al. | 370/338 |
| 2004/0258105 A1 | 12/2004 | Spathas et al. | 370/539 |
| 2005/0058451 A1 | 3/2005 | Ross | 398/70 |
| 2005/0078006 A1* | 4/2005 | Hutchins et al. | 340/561 |
| 2005/0093679 A1* | 5/2005 | Zai et al. | 340/10.2 |
| 2005/0116821 A1* | 6/2005 | Wilsey et al. | 340/539.13 |
| 2005/0174236 A1 | 8/2005 | Brookner | |
| 2005/0219050 A1 | 10/2005 | Martin | |
| 2005/0226625 A1 | 10/2005 | Wake et al. | 398/115 |
| 2005/0242188 A1 | 11/2005 | Vesuna | |
| 2005/0252971 A1 | 11/2005 | Howarth et al. | 235/451 |
| 2005/0266797 A1 | 12/2005 | Utsumi et al. | 455/7 |
| 2005/0266854 A1* | 12/2005 | Niiho et al. | 455/445 |
| 2005/0271396 A1 | 12/2005 | Iannelli | 398/193 |
| 2006/0002326 A1 | 1/2006 | Vesuna | |
| 2006/0017633 A1 | 1/2006 | Pronkine | 343/729 |
| 2006/0094470 A1 | 5/2006 | Wake et al. | 455/562.1 |
| 2006/0182449 A1 | 8/2006 | Iannelli et al. | 398/186 |
| 2006/0189354 A1 | 8/2006 | Lee et al. | 455/561 |
| 2007/0009266 A1 | 1/2007 | Bothwell et al. | 398/161 |
| 2007/0166042 A1 | 7/2007 | Seeds et al. | 398/142 |
| 2007/0253714 A1 | 11/2007 | Seeds et al. | 398/115 |

FOREIGN PATENT DOCUMENTS

| | | |
|---|---|---|
| EP | 0477952 A3 | 9/1991 |
| EP | 0461583 B1 | 3/1997 |
| EP | 0993124 A2 | 4/2000 |
| EP | 9003124 A3 | 4/2000 |
| EP | 1443687 A1 | 8/2004 |
| EP | 1511203 B1 | 3/2006 |
| EP | 1693974 A1 | 8/2006 |
| EP | 1742388 A1 | 1/2007 |
| GB | 2323252 A | 9/1998 |
| GB | 2399963 A | 9/2004 |
| GB | 2428149 A | 1/2007 |
| JP | 5260018 A | 8/1993 |
| JP | 083450 A | 3/1997 |
| JP | 9162810 A | 6/1997 |
| JP | 1168675 A | 3/1999 |
| JP | 2000-341744 | 8/2000 |
| JP | 2004-172734 | 6/2004 |
| WO | WO0230141 A1 | 4/2002 |
| WO | WO2004/056019 A1 | 7/2004 |
| WO | WO2004056019 A1 | 7/2004 |
| WO | WO2004/093471 A2 | 10/2004 |
| WO | WO2004/093471 A3 | 10/2004 |
| WO | WO2005/062505 A1 | 7/2005 |
| WO | WO2005/073897 A1 | 8/2005 |
| WO | WO2005/079386 A2 | 9/2005 |
| WO | WO2005/101701 A2 | 10/2005 |
| WO | WO2005/111959 A2 | 11/2005 |
| WO | WO2006/011778 A1 | 2/2006 |
| WO | WO2006/018592 A1 | 2/2006 |
| WO | WO2006/018592 A1 | 2/2006 |
| WO | WO2006/019392 A1 | 2/2006 |
| WO | WO2006/136811 A1 | 12/2006 |
| WO | WO2007/077451 A1 | 7/2007 |
| WO | WO2007/091026 A1 | 8/2007 |

OTHER PUBLICATIONS

Wake, D. et al., Passive Picocell: A New Concept in Wireless Network Infrastructure, Electronics Letters, vol. 33, No. 5, Feb. 27, 1997, pp. 404-406.

RFID Technology Overview, 11 pages.

Patent Cooperation Treaty, International Search Report for International Application No. PCT/US07/011034.

* cited by examiner

WIRELESS PICOCELLULAR RFID SYSTEMS AND METHODS

BACKGROUND OF THE INVENTION

1. Field of the Invention

The present invention relates generally to wireless communication systems, and particularly to wireless picocellular communication systems and radio-frequency identification (RFID) systems.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

Wireless Picocellular Systems

One approach to deploying a wireless communication system involves the use of "picocells," which are radio-frequency (RF) coverage areas having a radius in the range from about a few meters up to about 20 meters. Because the picocell covers a small area, there are typically only few users (clients) per picocell. This allows for minimizing the amount of RF bandwidth shared among the wireless system users. Also, picocells allow for selective wireless coverage in small regions that otherwise would have poor signal strength when covered by larger cells created by conventional base stations.

Picocells are created by and centered around a wireless access point device that includes an RF transmitter/receiver operably connected to an antenna. The size of a given picocell is determined by the amount of RF power transmitted by the access point device, the receiver sensitivity, antenna gain and the RF environment, as well as by the RF transmitter/receiver sensitivity of the wireless client device. Client devices usually have a fixed RF receive sensitivity, so that the above-mentioned properties of the access point device determine the picocell size.

Combining a number of access point devices creates an array of picocells that cover an area called a "picocellular coverage area." A closely packed picocellular array provides high-data-throughput over the picocellular coverage area.

Radio-Frequency Identification

Radio-frequency identification (RFID) is a remote recognition technique that utilizes RFID tags having information stored therein. The stored information is retrievable via RF communication between the RFID tag and an RFID tag reader. The typical RFID system utilizes an RFID reader (e.g., hand-held) that when brought sufficiently close to an RFID tag is able to read an RFID tag signal emitted by the tag. RFID systems are used for inventory management and product tracking in a variety of different industries, as well as in libraries and hospitals.

There are three main types of RFID tags. The first type is a passive RFID tag that has a microcircuit (typically, a digital memory chip) with no internal power supply. A passive RFID tag is powered by an incoming RF signal from the RFID tag reader. The RF signal provides enough power for the microcircuit to transmit the information stored in the RFID tag to the RFID reader via an electromagnetic RF tag signal.

The second type of RFID tag is semi-passive, and includes a microchip plus a small power supply so that RFID tag can generate a stronger RF tag signal, leading to a greater read range. The third type of RFID tag is active and, like the semi-passive type tag, has its own power supply. Active RFID tags generate an outgoing RF tag signal and can respond to RF signal queries from the RF tag reader, or periodically generate their own outgoing RF tag signal.

Implementing an RFID system that covers a relatively large area (e.g., an entire office building) and that track many items with high-resolution usually requires deploying a large number of RFID tag readers and connecting them to a central computer that can process the data received from the RFID tags. Reading the RFID tags is accomplished, for example, by people physically carrying RFID tag readers over the premises and interrogating each RFID tag. This conventional approach to RFID is equipment-intensive and labor-intensive, and tends to be expensive to implement and maintain.

SUMMARY OF THE INVENTION

One aspect of the invention is a wireless picocellular radio-frequency identification (RFID) system for tracking one or more RFID tags each having information stored therein. The system includes a picocellular coverage area made up of an array of picocells formed by one or more electrical-optical (E-O) access point devices each having an antenna and each adapted to convert electrical RF signals to optical RF signals and vice versa. The system further includes a central control station having one or more service units and an RFID reader unit. The central control station is optically coupled to each E-O access point device via an RF optical communication link. Each E-O access point device is adapted to receive and relay information stored in each RFID tag located within the corresponding picocell to the RFID reader unit over the RF optical communication link.

Another aspect of the invention is a wireless picocellular RFID system for tracking one or more RFID tags that emit electromagnetic RFID tag signals. The system includes a central control station having one or more service units and one or more RFID reader units. The number of RFID reader units typically depends on the volume of RFID tag signals to be processed. The system also includes one or more E-O access point devices optically coupled to the central control station and adapted to convert optical RF service signals from the central control station to electromagnetic RF service signals and vice versa, thereby forming one or more picocells. Each E-O access point device is adapted (e.g., via an electrical-to-optical converter) to receive electromagnetic RFID tag signals from any of the one or more RFID tags present in the corresponding picocell and optically transmit corresponding RFID optical signals to the central control station. The central control station is adapted to convert RFID optical signals into electrical RFID signals, which are then received by the one or more RFID reader units.

Another aspect of the invention is a wireless picocellular RFID method. The method includes locating one or more RFID tags having information stored therein within a picocellular coverage area made up of one or more picocells, and receiving in each picocell information from each RFID tag located therein. The method also includes optically transmitting the RFID tag information to a remotely located RFID reader unit.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

Figure 1:
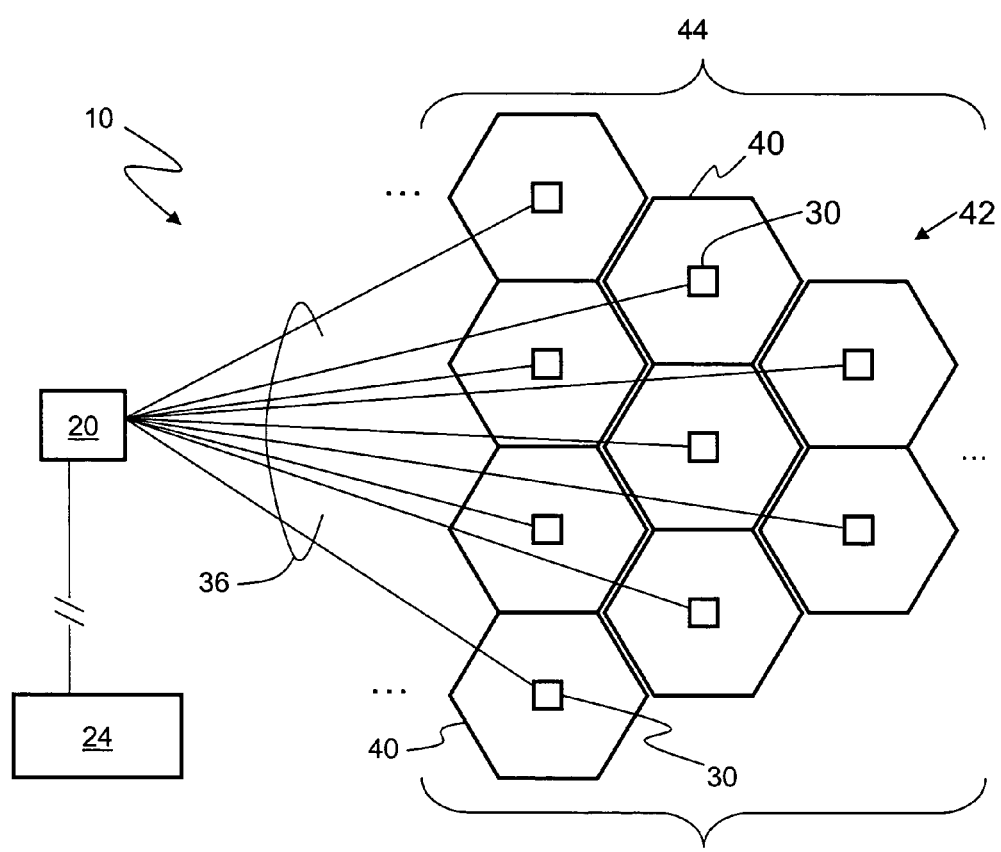
FIG. 1 is a schematic diagram of an example embodiment of a wireless picocellular RFID system according to the present invention.

FIG. 1 is a schematic diagram of an example embodiment of a wireless picocellular RFID system 10 according to the present invention. System 10 includes a central control station 20 (also called a "head end") where all the network management and signal processing is done, and where communication to outside networks such as outside network 24 is established. The central control station 20 is operably coupled to a number of electrical-optical (E-O) access point devices 30 via corresponding RF optical communication links 36 In a preferred embodiment, RF optical communication links 36 include optical fibers, e.g., downlink and uplink optical fibers, as discussed below. The E-O access point devices 30 are arranged to form an array 42 of one or more picocells 40 that constitute a picocellular coverage area 44.

Figure 2:
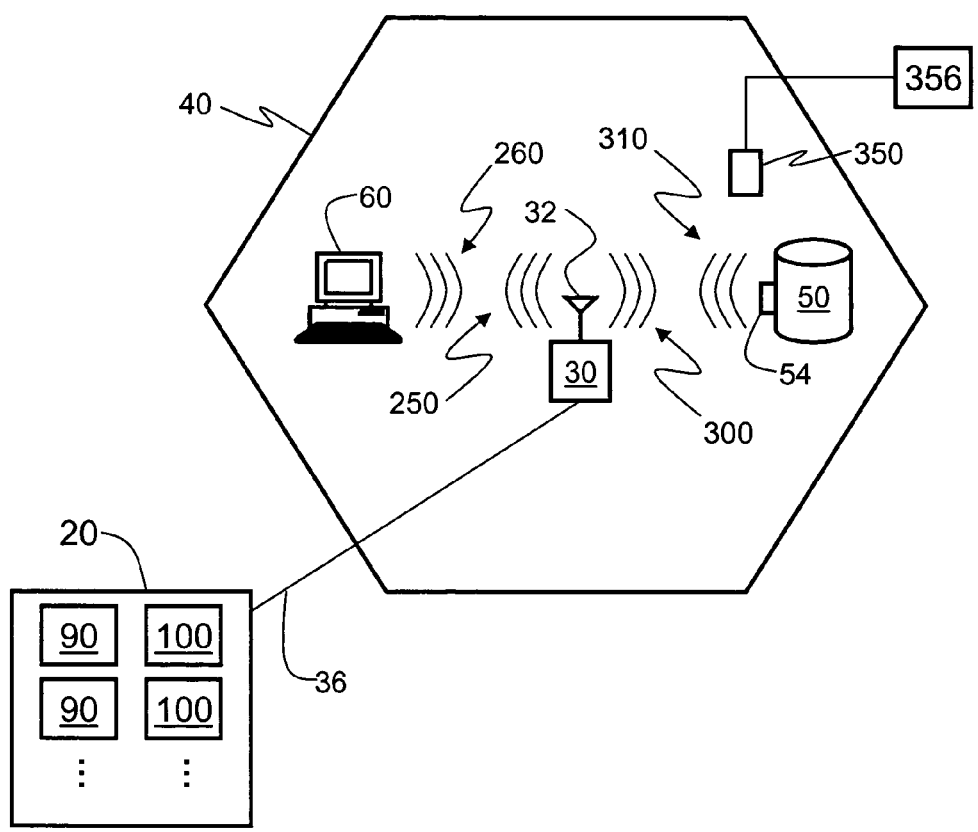
FIG. 2 is a close-up view of the system of FIG. 1, showing an example picocell and its corresponding E-O access point device, and also showing within the picocell an example wireless client device in the form of a computer, and an item having an RFID tag attached thereto.

FIG. 2 is a close-up view of wireless picocellular RFID system 10 of FIG. 1, showing an example of a single picocell 40 and its corresponding E-O access point device 30. In an example embodiment, E-O access point device 30 includes an antenna 32 around which picocell 40 is centered. Antenna 32 is electrically coupled to an electrical-to-optical (E/O) converter 150 that receives an electrical signal and converts it to an optical signal, and to an optical-to-electrical (O/E) converter 170 that receives an optical signal and converts it to an electrical signal. In an example embodiment, each E-O access point device 30 does not engage in signal processing in the manner of conventional WLAN access point devices. Rather, they simply serve as RF signal transponders, as described in greater detail below.

Also shown in picocell 40 is an item 50 that has an RFID tag 54 attached thereto. Item 50 is any item that is to be tracked by system 10. RFID tag 54 can be, for example, a passive, a semi-passive or an active type of RFID tag. In an example embodiment, one or more RFID tags 54 and their corresponding items 50 are located within picocellular coverage area 44. Also shown in picocell 40 is a wireless client device 60, which for the sake of illustration is shown in the form of a computer.

Figure 3:
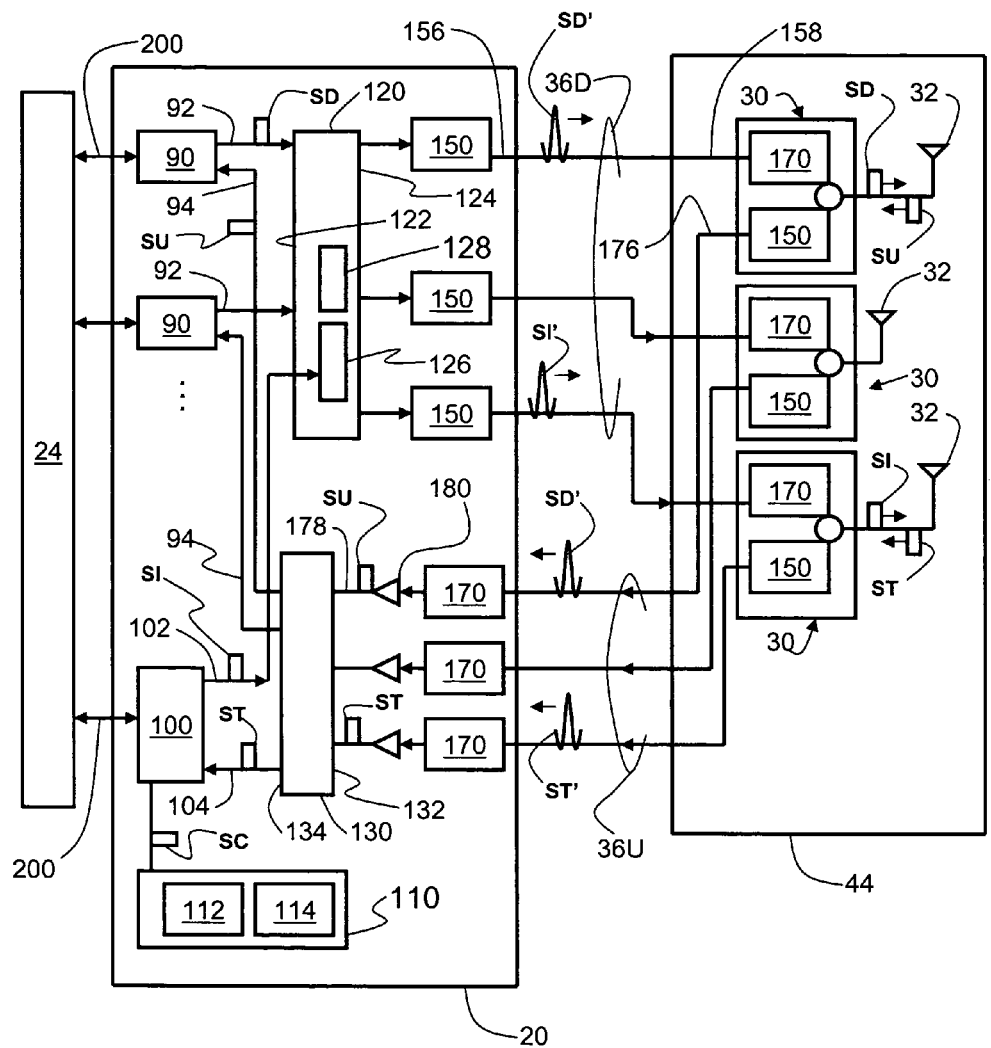
FIG. 3 is a detailed schematic diagram of an example embodiment of the picocellular RFID system according to the present invention, showing the details of an example embodiment of the central control station operably coupled to the E-O access point devices via respective optical fiber downlinks and uplinks.

FIG. 3 is a detailed schematic diagram of an example embodiment of wireless picocellular RFID system 10 showing the details of central control station 20 and E-O access point devices 30 that form picocellular coverage area 44. In a preferred embodiment, RF optical communication link 36 is optical-fiber based and in an example embodiment includes an one or more optical fiber downlinks 36D and one or more optical fiber uplinks 36U.

In an example embodiment, central control station 20 includes a number of service units 90 that provide conventional wireless cellular system services, such as cellular phone service, WIFI for data communication, etc. Two service units 90 are shown for the sake of illustration. Service units 90 each have an RF transmission line 92 and an RF receiving line 94. Also included in central control station 20 is an RFID reader unit 100 that provides RFID capability for system 10. RFID reader unit 100 has an RF transmission line 102 and an RF receiving line 104.

Wireless picocellular RFID system 10 further includes a controller 110 operably coupled to RFID reader unit 100. In an example embodiment, controller 110 includes a central processing unit (CPU) 112 and a memory unit 114 for storing data, including RFID tag information obtained as described below. CPU 112 is adapted (e.g., is programmed) to process information provided to controller 110 by RFID reader unit 100. In an example embodiment, controller 110 is or includes a programmable computer.

Central control station 20 includes a first RF signal multiplexer unit 120. RF signal multiplexer unit 120 has an input side 122 and an output side 124. Transmission lines 92 and 102 are electrically connected to RF signal multiplexer unit 120 at input side 122.

In an example embodiment, RF signal multiplexer unit 120 includes a first RF signal-directing element 126 (e.g., an RF switch) that allows for selective communication with picocells 40 by RFID reader unit 100, as described below. In an example, the selective communication involves sequential communication (e.g., polling) of picocells 40. Also in an example embodiment, RF signal multiplexer unit 120 includes a second RF signal-directing element 128 (e.g., an RF switch) that allows for the different RF service signals (introduced below) from different service units 90 to be radiated from a single antenna 32 in each picocell 40.

Central control station 20 also includes a second RF signal multiplexer unit 130 having an input side 132 and an output side 134. Receiving lines 94 and 104 are electrically connected to RF signal multiplexer unit 130 at output side 134.

In an example embodiment, central control station 20 also includes a number of electrical-to-optical (E/O) converters 150 that convert an RF electrical signal into an RF optical signal. E/O converters 150 are electrically coupled to output end 124 of RF signal multiplexer unit 120, and are optically coupled to an input end 156 of optical fiber downlinks 36D. Central control station 20 also includes a number of optical-to-electrical (O/E) converters 170 that convert an RF optical signal to an RF electrical signal. O/E converters 170 are electrically coupled to input end 132 of RF signal multiplexer unit 130, and are optically coupled to output ends 178 of optical fiber uplinks 36U.

In an example embodiment, central control station 20 includes amplifiers 180 between RF signal multiplexer unit 130 and O/E converters 170 to amplify the uplink RF electrical signals, as discussed below. Also included in central control station 20 are outside network links 200 that link service units 90 and RFID reader unit 100 to one or more outside networks 24.

With continuing reference to FIG. 3, as discussed above, in an example embodiment each access point device 30 includes an O/E converter unit 170 and an E/O converter unit 150. The O/E converters 170 are optically coupled to respective output ends 158 of optical fiber downlinks 36D. The E/O converters 150 are optically coupled to input ends 176 of optical fiber uplinks 36U. The E/O converters 150 and the O/E converters 170 are also operably coupled to their respective antennae 32. In an example embodiment, the optical coupling associated with E-O access point devices 30 includes additional electronic elements, such as amplifiers and filters (not shown).

Method of Operation

With reference to FIG. 1 through FIG. 3, picocellular RFID system 10 operates as follows. At central control station 20, service units 90 generate downlink electrical RF service signals SD that are transmitted over transmission lines 92 to multiplexer unit 120. Multiplexer unit 120 distributes downlink electrical RF service signals SD to the E/O converters 150 electrically coupled thereto, which convert these signals into corresponding downlink optical RF service signals SD'. The downlink optical RF service signals SD' travel over optical fiber downlink 36D to their corresponding O/E converters 170 in the E-O access point devices 30, where the optical signals are converted back to downlink electrical RF service signals SD. Downlink electrical RF service signals SD then drive the corresponding antennae 32, which converts the downlink electrical RF service signals SD into respective downlink electromagnetic RF service signals 250 (FIG. 2) that correspond to the particular services (cellular phone, data, etc.) provided by service units 90.

Assuming for the moment that downlink electromagnetic RF service signals 250 represent data, client 60 receives the data (e.g., via a wireless card, not shown) and processes the data. Client 60 also generates an uplink electromagnetic RF service signal 260, which is received by antenna 32. Antenna 32 converts the uplink electromagnetic RF service signal 260 into an uplink electrical RF service signal SU. Whether or not signal amplification is used in E-O access point devices 30 depends on the details of the picocellular system design.

E/O converter 150 receives uplink electrical RF service signal SU and converts it into an uplink optical RF service signal SU', which travels over optical fiber uplink 36U to O/E converter 170 in central control station 20. O/E converter 170 then converts uplink optical RF service signal SU' back to uplink electrical RF service signal SU, which is optionally amplified by amplifier 180 and sent on to RF signal multiplexer unit 130. RF signal multiplexer unit 130 then distributes the uplink electrical RF service signals SU from the different picocells 40 to the corresponding service units 90, where the service signals are processed—e.g., digitally processed and sent on to outside network 24 via network links 200.

In an example embodiment, the different services from the service units 90 are combined at the RF signal level by frequency multiplexing by providing the different services (i.e. cellular phone service, WiFi for data communication, etc.) with different and independent digital signal processing. Once RF service signals SD are generated, RF signal-directing element 128 directs them to the different E-O access point devices 30 so as to allow for the different RF service signals to be radiated from a single antenna 32 on each access point device. The corresponding service units 90 at central control station 20 conduct the individual signal processing for the different services. Each picocell 40 carries individual RF service signals SD designated for each client 60 within the particular picocell.

RFID Functionality

Wireless picocellular RFID system 10 of the present invention includes RFID functionality. In an example embodiment, some or all of the one or more RFID tags 54 within picocellular coverage area 44 requires activation with an RFID interrogation signal. Activation by the RFID interrogation signal causes RFID tag 54 to emit an electromagnetic RFID tag signal that contains information stored in the tag. In a passive RFID tag 54, for example, the power in the electromagnetic RFID interrogation signal energizes a microchip (not shown) in the RFID tag with enough power to transmit the information stored in the RFID tag memory portion of the chip.

Accordingly, with continuing reference to FIG. 3, RFID reader unit 100 generates and sends an electrical RFID interrogation signal SI over RFID transmission line 102 to RF signal multiplexer unit 120. In an example embodiment wherein picocells 40 are sequentially polled, RF signal-directing 126 in signal multiplexer unit 120 directs RFID interrogation signal SI to one of the E/O converters 150. The E/O converter 150 converts electrical RF interrogation signal SI into an optical RF interrogation signal SI', which travels over the corresponding optical fiber downlink 36D to the corresponding O/E converter 170. The O/E converter 170 converts optical RF interrogation signal SI' back to electrical RF interrogation signal SI. Electrical RF interrogation signal SI is then directed to the corresponding antenna 32, which converts the electrical RF interrogation signal into an electromagnetic RF interrogation signal 300 (FIG. 2).

Electromagnetic RF interrogation signal 300 causes each RFID tag 54 in picocell 40 to emit an electromagnetic RFID tag signal 310. Antenna 32 then receives this electro-magnetic RFID tag signal. Assuming for the moment that only a single RFID tag 54 is present in the picocell 40 in question, antenna 32 converts electromagnetic RFID tag signal 310 into an electrical RFID tag signal ST and directs it to E/O converter 150, which converts it to an optical RFID tag signal ST'. Optical RFID tag signal ST' travels over optical fiber uplink 36U to the corresponding O/E converter 170, which converts this optical signal back to electrical RFID tag signal ST. Electrical RFID tag signal ST then travels to RF signal multiplexer unit 130, which directs this signal to RFID unit 100 via RF receiving line 104. RFID reader unit 100 then processes electrical RFID tag signal ST to extract the information contained therein, such as the number of the tag or the nature of the item tagged, etc. With the knowledge of the setting of the signal directing element 126 (e.g., RF switch), RFID reader unit 100 can extract the location of the tag, i.e., the particular picocell in which the RFID tag was read. In an example embodiment, RFID reader unit 100 passes along RFID tag information to controller 110 via a signal SC. Controller 110 either processes this information in processor 112 and then stores the results in memory unit 114, or simply stores the information directly in the memory unit, e.g., in the form of a history log of each RFID tag 54.

In an example embodiment, the above process is repeated by sequentially communicating with each picocell 40. This is accomplished, for example, by RF signal-directing element 126 sequentially directing RF interrogation signals SI to the different E/O converters 150 associated with the different picocells 40 one at a time, thereby covering the array 42 of picocells 40 that define the picocellular coverage area 44.

In another example embodiment, at least one of the RFID tags 54 is an active-type tag that generates electromagnetic RFID tag signal 310 without having to be interrogated by an RFID interrogation signal. For this type of RFID tag 54, the RFID process is as described above, but without the generation of RFID interrogation signal 300 by RFID reader unit 100. Rather, the electromagnetic RFID tag signal 310 is generated and emitted by the RFID tag (e.g., periodically) and is picked up by antenna 32, which converts it to electrical RFID tag signal ST, which is a relayed to RFID reader unit 100, as described above.

If multiple RFID tags 54 are located in a given picocell 40, in an example embodiment RFID reader unit 100 reads one RFID tag at a time. This involves, for example, sending an RFID interrogation signal 300 out to all RFID tags 54, with a tag number starting with a certain bit. If more than one RFID tag 54 responds, RFID reader unit 100 uses the next bit in the RFID tag number to distinguish between the multiple RFID tags until just one RFID tag responds. The other RFID tags 54 within the picocell are read at different times based upon their particular RFID tag numbers.

In an example embodiment, the RFID tag signals ST have a similar frequency and amplitude to that of the existing wireless communication service signals SD associated with service units 90 so that the RFID service can easily be combined with the other picocellular services.

For wireless data services, the individual RF service signals SD for each picocell communicate with clients 60 at a high speed and at a high bit rate. However, the RFID process is very slow in comparison because in an example embodiment only relatively few bits of information (e.g., 1 bit up to about 1 kilobyte) are exchanged between each RFID tag 54 and RFID reader unit 100. Further, RFID communication in most cases is not very time critical. Accordingly, the present invention does not require individual RFID reader units for each picocell 40 to maintain communication with the RFID tags 54 in their associated picocells. Rather, in an example embodiment, a single RFID reader unit 100 is used, and system 10 is uses a single RFID reader unit 100 that communicates with each picocell 40. In a typical application, every picocell 40 is polled once every second to once every minute, though other polling speeds can be implemented depending on the particular application.

In an example embodiment wherein RFID communication between picocells 40 with a single RFID reader unit 100 would be too slow, two or more RFID reader units 100 are used to communicate with different subsets of picocells 40 (FIG. 2). Multiple RFID reader units 100 might be used in picocellular RFID system 10, for example, when there is a need to inventory a large number of RFID tags 54 (e.g., thousands or many thousands) in a given picocell 40, and wherein the picocell array 42 is made up of many (e.g., hundreds or thousands) of picocells.

Advantages of a Picocellular RFID System

The wireless picocellular RFID system of the present invention is very flexible and has a number of advantages over conventional RFID systems. For example, the main frequencies used for RFID label reading are frequencies in the range from about 900 MHz to 2.4 GHz, which are readily supported by picocellular system 10, which typically operate in the frequency range from about 800 MHZ to 6.0 GHz.

Also, the preferred RFID transmit and receive power levels used in the present invention are comparable to existing wireless communication systems. In an example embodiment where the same frequency bands are used by several services—such as WiFi and RFID label reading at 2.4 GHz— techniques to avoid catastrophic interference for extended time periods, such as frequency hopping and/or static channel allocation, are utilized.

RFID system upgrades are simple to execute since the picocellular infrastructure is well suited to support making changes at central control station 20. In an example embodiment of the present invention, RFID reader unit 100 is used for RFID tag writing to add or update information in RFID tags 54. RFID tag writing allows changing item assignments, e.g., to different work groups, projects, or the item status (e.g., from "on sale" to "sold").

Logging RFID Data

In an example embodiment of the invention, system 10 polls the RFID tags 54 within the cellular coverage area 44 to keep a history log in controller 110 of all RFID tags associated with tagged items 50. Due to the relatively small picocells 40, at any given time system 10 knows the locations of all items 50 within picocellular coverage area 44 to a very high spatial resolution, e.g., a few meters. In an example embodiment, the communication distance of RFID tags 54 is physically limited to a few meters, thereby defining the RFID location resolution of system 10.

Wireless picocellular RFID system 10 is capable of supporting a very large number of RFID tags 54, particularly in the case where controller 110 has modern computer processing capability. In an example embodiment, the present invention includes computer-based position and/or movement tracking of items 50 by RFID reader unit 100 and controller 110.

A related example embodiment includes storing information in one or more RFID tags 54 information about the last time the corresponding one or more items were moved, as well as its past and present locations. In an example embodiment, system 10 accomplishes this function by controller 110 providing the information to RFID reader unit 100, and the RFID reader unit sending this information to the particular RFID tag 54 in a manner similar to the RFID reader unit sending out RF interrogation signals SI. In an example embodiment, the position and time information is then read out with an independent RFID tag reader 350 (FIG. 2) not connected to the picocellular RFD system 10 but rather to a central databank 356. In contrast to such a decentralized record keeping, all information is stored in central databank 356, which is accessible at any time through an independent computer network (not shown).

Introducing New RFID Tags into the Picocellular Coverage Area

In an example embodiment, RFID reader unit 100 discovers new RFID tags 54 introduced into picocellular coverage area 44 upon the next RFID polling event. In an example embodiment, if an RFID tag 54 is destroyed, RFID reader unit 100 and/or controller 110 is adapted (e.g., programmed) to generate an alarm, and provide from the stored log in memory unit 112 in controller 110 the last position (or complete tracking history) of the item.

WDM Approach

Optical fiber downlinks and uplinks 36D and 36U (FIG. 3) have very low loss and a very large bandwidth. Therefore, central control station 20 can be essentially any distance away from picocellular coverage area 44. For example, several kilometers or even tens of kilometers between central control station 20 and E-O access point devices 30 is supported.

Figure 4:
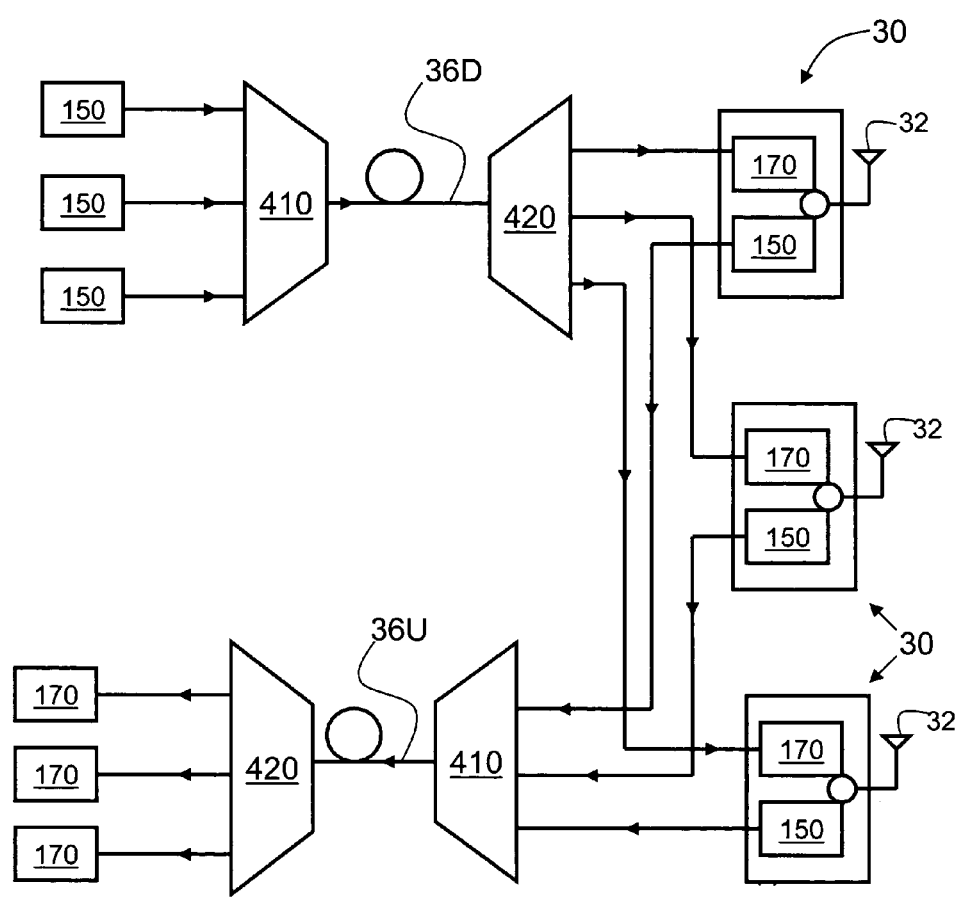
FIG. 4 is a close-up view of the system of FIG. 3, illustrating an example embodiment of the system that utilizes wavelength-division multiplexing (WDM) and a single optical fiber downlink and a single optical fiber uplink to provide a two-way RF optical communication link between the E-O access point devices and the central control station.

FIG. 4 is a close-up view of an example embodiment of wireless picocellular RFID system 10 that shows E/O converters 150 and O/E converters 170 used in combination with optical multiplexing units 410 and optical demultiplexing unit 420, along with a single optical fiber downlink 36U and a single optical fiber downlink 36D. The use of wavelength-division multiplexing (WDM) allows many different E-O access point devices 30 to share a single optical fiber, rather than using separate optical fiber uplinks and downlinks illustrated in FIG. 3. A WDM approach using optical fiber downlinks and uplinks 36D and 36U is advantageous if central control station 20 is many kilometers away from picocellular coverage area 44. The present invention includes a related WDM example embodiment that employs add-drop multiplexers and de-multiplexers (not shown) rather than the optical multiplexing and demultiplexing units 410 and 420.

Overlapping Picocells

Picocells 40 generally do not have sharp boundaries in practice. Consequently, it can happen that more than one picocell 40 covers and reads the same RFID tag 54. In this case, system 10 can precisely identify the location of the corresponding item 50. If two or more picocells 40 read an RF tag 54, the tag must be located at the crossing points between the picocells. In an example embodiment, RF reader unit 100 (or controller 110) is thus adapted (e.g., programmed) to account for picocell overlap and determine the position of the item.

Additional Applications

Figure 5:
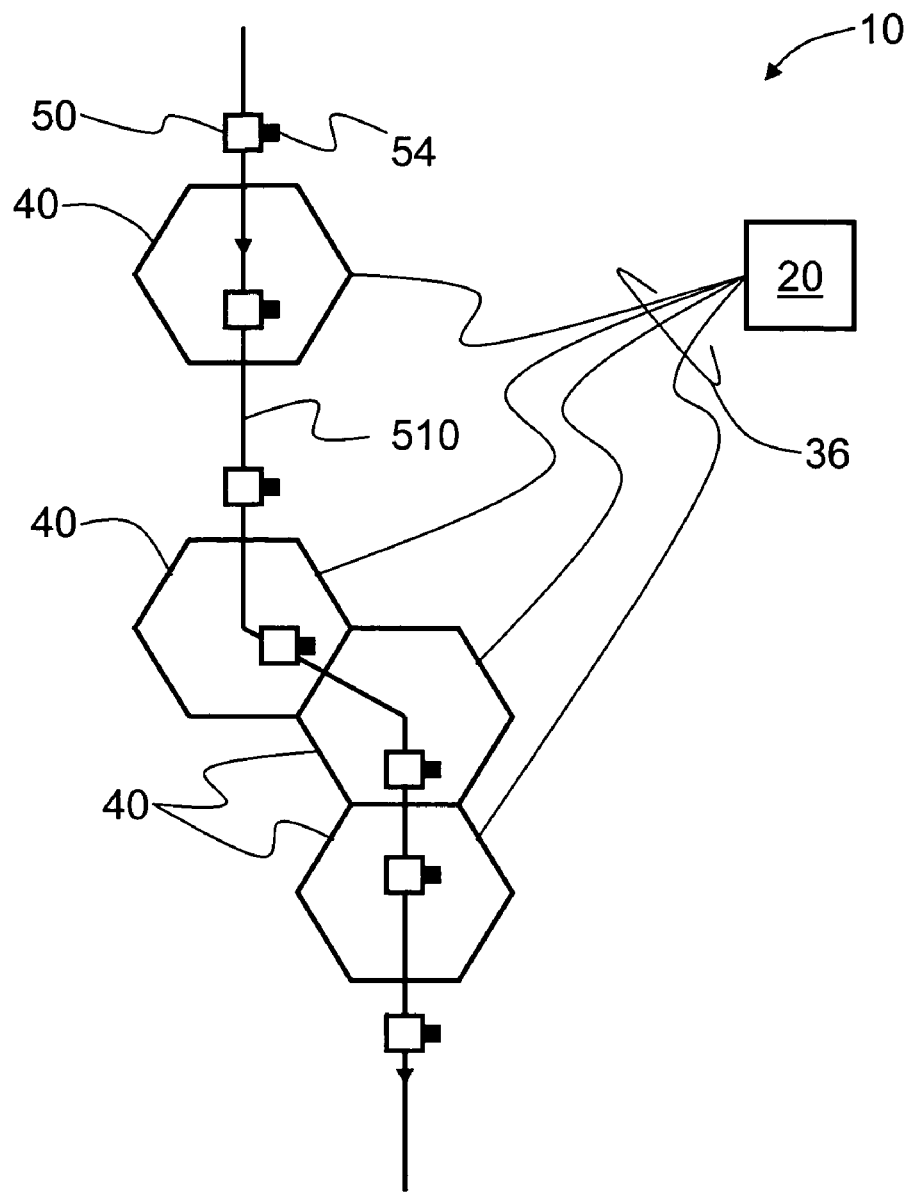
FIG. 5 is a schematic diagram of an example application of the system of FIG. 1 arranged to monitor items moving along a defined path such as an assembly line.

An example application of wireless picocellular RFID system 10 includes monitoring a process and assisting in process control. In an example embodiment illustrated in FIG. 5, system 10 monitors information contained in RFID tags 54 as the associated items 50 move over a defined path 510, e.g., an assembly line of a process. The information in the RFID tags 54 changes as the state and/or the position of the items change as they move over path 510. Picocells 40 are located at different monitoring points along path 510 and gather information about the status of items 50, such as the time and location information, and processing status.

Another example application involves security monitoring of highly valuable items 50. When an RFID tag 54 moves beyond a defined picocell location(s), and alarm is sounded (e.g., by controller 110) Such security monitoring can be used, for example, to monitor art in art galleries, medicines in hospitals/clinics, nuclear materials at nuclear facilities, rare books, maps and other works at libraries, etc.

Another example application involves building access control, whereby picocells 40 monitor the position and movements of persons (which can be considered as "items" in the context of the present invention) that are required to wear RFID tags.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A wireless picocellular radio-frequency identification (RFID) system for tracking one or more RFID tags each having information stored therein, comprising:
    a picocellular coverage area made up of an array of picocells formed by one or more electrical-optical (E-O) access point devices each having an antenna and each adapted to convert electrical RF signals to optical RF signals and vice versa;
    a central control station having one or more service units and an RFID reader unit, and optically coupled to each E-O access point device via an RF optical communication link; and
    wherein each E-O access point device is adapted to receive and relay information stored in each RFID tag located within the corresponding picocell to the RFID reader unit over the RF optical communication link.

2. The system of claim 1, further comprising a controller operably coupled to the RFID reader unit and adapted to process and/or store the RFID tag information.

3. The system of claim 1, wherein the optical communication link includes uplink and downlink optical fibers.

4. The system of claim 3, wherein the uplink and downlink optical fibers are each coupled at their respective ends to respective wavelength-division multiplexers and wavelength-division demultiplexers.

5. The system of claim 1, wherein the control station comprises an RF signal-directing element that allows for the RFID reader unit to communicate with one E-O access point device at a time.

6. A wireless picocellular radio-frequency identification (RFID) system for tracking one or more RFID tags that emit electromagnetic RFID tag signals, comprising:
    a central control station having one or more service units and one or more RFID reader units;
    one or more electrical-optical (E-O) access point devices optically coupled to the central control station and adapted to convert optical RF service signals from the central control station to electromagnetic RF service signals and vice versa, thereby forming one or more picocells, with each E-O access point device being adapted to receive electromagnetic RFID tag signals from any of the one or more RFID tags present in the corresponding picocell and optically transmit corresponding optical RFID tag signals to the central control station; and
    wherein the central control station is adapted to convert the optical RFID tag signals into electrical RFID tag signals, which are then received by the one or more RFID reader units.

7. The system of claim 6, wherein downlink and uplink optical fibers carry downlink and uplink optical RF signals and wherein the one or more E-O access point devices and the central control station comprise electrical-to-optical (E/O) converters and optical-to-electrical (O/E) converters operably coupled to the downlink and optical fiber uplinks so as convert downlink and uplink electrical RF signals to downlink and uplink optical RF signals, and vice versa.

8. The system of claim 6, wherein the central control station comprises one or more RF signal-directing elements electrically coupled to the corresponding one or more RFID reader units so as to allow the one or more RFID reader units to communicate with one access point device at a time.

9. The system of claim 6, wherein the central control station is operably coupled to an outside network.

10. The system of claim 6, wherein at least one RFID reader unit is adapted to generate an RF interrogation signal that is provided to the one or more E-O access point devices so as to generate an electromagnetic RF interrogation signal that causes at least one RFID tag to emit an electromagnetic RFID tag signal.

11. The system of claim 6, wherein the one or more RFID tags are affixed to corresponding one or more items.

12. The system of claim 6, wherein the RFID reader unit is adapted to store information contained in the electrical RFID tag signals.

13. The system of claim 6, further comprising a controller operably coupled to the RFID reader unit and adapted to process and/or store information provided by the RFID reader unit.

14. A wireless picocellular radio-frequency identification (RFID) method, comprising:
    locating one or more RFID tags having information stored therein within a picocellular coverage area made up of one or more picocells;
    receiving in each picocell information from each RFID tag located therein;
    optically transmitting the received RFID tag information to a remotely located RFID reader unit; and
    forming each picocell using an access point device adapted to receive and transmit optical RF signals over downlink and uplink optical fibers operably coupled to a central control station.

15. The method of claim 14, including generating an electromagnetic RFID interrogation signal that causes at least one RFID tag to emit an electromagnetic RFID tag signal representative of the information stored therein.

16. The method of claim 14, including fixing the one or more RFID tags to corresponding one or more items.

17. The method of claim 14, including communicating between the RFID reader unit and the one or more picocells one picocell at a time.

18. The method of claim 14, including updating information stored in at least one of the one or more RFID tags via operation of the RFID reader unit.

19. The method of claim 14 including arranging the one or more picocells so as to track RFID tags affixed to items as the items move along a defined path.

* * * * *